Figure 1:
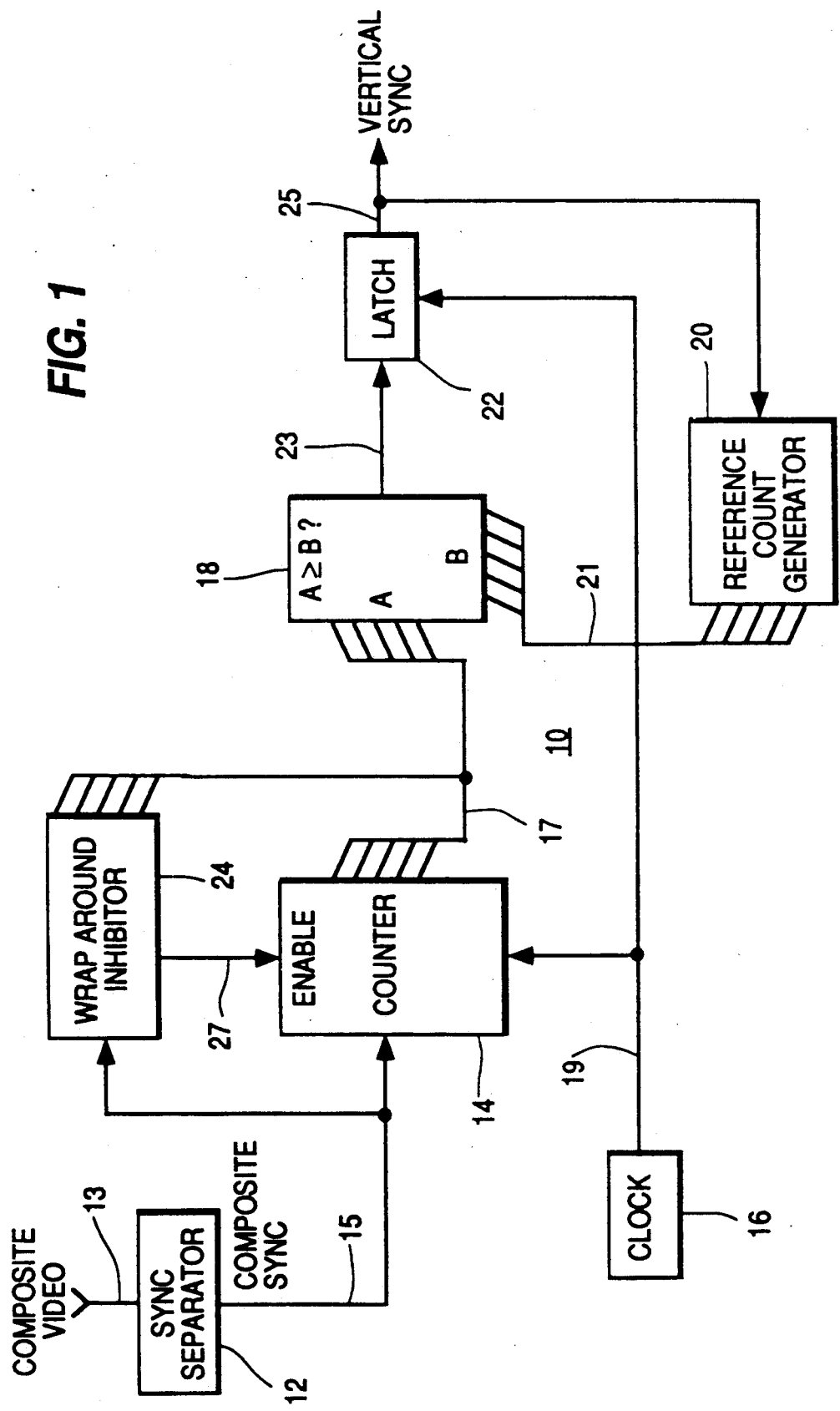

United States Patent [19]

Fling

[11] Patent Number: 5,031,041
[45] Date of Patent: Jul. 9, 1991

[54] DIGITAL DETECTOR/FILTER FOR SYNCHRONIZING SIGNALS

[75] Inventor: Russell T. Fling, Naperville, Ill.

[73] Assignee: Thomson Consumer Electronics, Inc., Indianapolis, Ind.

[21] Appl. No.: 340,651

[22] Filed: Apr. 20, 1989

[51] Int. Cl.$^5$ ............................................. H04N 5/08
[52] U.S. Cl. .................................... 358/154; 358/153
[58] Field of Search ................................ 358/153, 154

[56] References Cited

U.S. PATENT DOCUMENTS

| 4,025,952 | 10/1977 | Eckenbrecht | 358/158 |
|---|---|---|---|
| 4,166,250 | 8/1979 | Meki et al. | 328/165 |
| 4,214,270 | 7/1980 | Morito | 358/154 |
| 4,357,630 | 11/1982 | Odaka | 358/154 |
| 4,600,944 | 7/1986 | Williams | 358/154 |
| 4,684,988 | 9/1987 | Johannes | 358/154 |
| 4,697,211 | 9/1987 | Balaban et al. | 358/153 |
| 4,698,697 | 10/1987 | Balaban et al. | 358/153 |

FOREIGN PATENT DOCUMENTS

| 0056767 | 4/1980 | Japan | 358/154 |
|---|---|---|---|
| 0074781 | 4/1985 | Japan | 358/154 |

Primary Examiner—Victor R. Kostak
Attorney, Agent, or Firm—Joseph S. Tripoli; Joseph J. Laks; Harvey D. Fried

[57] ABSTRACT

A detector for vertical synchronizing pulses comprises a nonwrapping up/down counter and a comparator. The counter level samples a composite synchronizing signal at a sampling rate. The counter has a numerical output which increases responsive to detection of said level during a sample interval and decreases responsive to nondetection of said level during a sample interval. The comparator generates a vertical sync detection pulse when the numerical output of the counter is greater than a reference value. In order to provide hysteresis, the numerical value os alternately one of first and second numerical reference counts, the first reference count being greater than the second reference count. The comparator initiates the vertical sync detection pulse when the numerical output of the counter rises above the first reference count and terminates the vertical sync detection pulse when the numerical output of the counter falls falls below the second reference count. The numerical reference supplied to the comparator is changed at times corresponding to initiation and termination of each vertical sync detection pulse. A pulse shaping circuit may comprise a latch for sampling the output of the comparator and generating a vertical synchronizing signal.

24 Claims, 2 Drawing Sheets

DIGITAL DETECTOR/FILTER FOR SYNCHRONIZING SIGNALS

The invention relates to the field of filters for television scanning synchronizing signals in general, and in particular, to the field of digital detectors for vertical synchronizing signals.

Receivers in televisions, video recorders and the like receive and process a composite video signal. The composite video signal includes video information as well as horizontal and vertical synchronizing information. Synchronizing pulses are transmitted during a blanking period when no picture information is transmitted. A horizontal synchronizing pulse is transmitted for each horizontal line and a vertical synchronizing pulse is transmitted for each field to synchronize the vertical scanning motion. In the NTSC system, for example, the horizontal synchronizing pulses have a frequency of approximately 15,750 Hz and the vertical synchronizing pulses have a frequency of approximately 60 Hz.

Horizontal and vertical synchronizing pulses generally have the same amplitude, but differ in pulse width. The vertical synchronizing pulses are much wider than the horizontal synchronizing pulses. Each vertical synchronizing pulse, for example, extends over a period equal to six half lines or three complete horizontal lines, making it much wider than a horizontal pulse. Each wide vertical pulse is actually composed of six individual pulses separated by five serrations. The five serrations are inserted in the vertical pulse at half line intervals. The composite video signal also includes equalizing pulses, spaced at half line intervals. The equalizing pulses, which are repeated at half line intervals, provide identical waveshapes in the separated vertical synchronizing signal for even and odd fields so that constant timing may be obtained for good interlace of the fields. In view of the disparity in frequency and pulse widths between horizontal and vertical synchronizing pulses, vertical synchronizing pulses have been separated, for example from a composite synchronizing signal in which the video information has been removed, by detecting the characteristic lower frequency or wider pulse width.

As the use of integrated circuits becomes more common in television receivers, the use of digital techniques for separating synchronizing signals has become more common. Such digital filtering techniques as have been developed for separating vertical synchronizing pulses, and generating a vertical synchronizing signal, tend to be complex and unnecessarily expensive. Those techniques which are not complicated seem more prone to false detection from noise in the composite synchronizing signal.

This invention recognizes the need to provide a simple and inexpensive vertical synchronizing pulse detector which is particularly immune to false detection from noise in the composite synchronizing signal. This invention recognizes a further need to provide a digital vertical synchronizing signal detector which can be embodied in an integrated circuit to form part of a larger video signal processing circuit. Finally, this invention recognizes yet another need for a vertical synchronizing signal detector which is sufficiently reliable to form part of a so-called pix in pix video control circuit, wherein a multiple display image comprises a large primary picture with a smaller and compressed inset secondary picture. Such a vertical synchronizing signal detector must provide timing control signals for properly temporarily storing video information concerning the inset secondary picture, and for thereafter reading such video information out of temporary storage in proper timed relationship to the scanning sequence of the primary picture.

It is an aspect of the invention to provide a detector for vertical synchronizing pulses which is simple and inexpensive to implement, but which is nevertheless reliable. In accordance with this aspect of the invention, a detector for vertical synchronizing pulses may comprise a counter and a comparator. The counter level samples a composite synchronizing signal at a sampling rate and has a numerical output which increases responsive to detection of the level during a sample interval and decreases responsive to nondetection of the level during a sample interval. The comparator generates a vertical sync detection pulse as an output signal when the numerical output of the counter is greater than a reference value. Alternatively, the comparator may generate the vertical sync detection pulse when the numerical output of the counter is greater than or equal to the reference value.

It is a further aspect of the invention to provide reliable detection of vertical synchronizing signals with improved immunity to noise. In accordance with this aspect of the invention, the numerical value is alternately one of first and second numerical reference counts, first reference count being greater than the second reference count. The comparator initiates the vertical sync detection pulse when the numerical output of the counter rises above the first reference count and terminates the vertical sync detection pulse when the numerical output of the counter falls to the second reference count. Alternatively, the comparator initiates the vertical sync detection pulse when the numerical output of the counter rises to equal the first reference count, and the comparator terminates the vertical sync detection pulse when the numerical output of the counter falls below the second reference count. This provides a detector with a hysteresis characteristic.

It is another aspect of this invention to provide a detector for vertical synchronizing pulses in a circuit configuration which may be embodied in an integrated circuit, for example as a digital filter.

Figure 2:
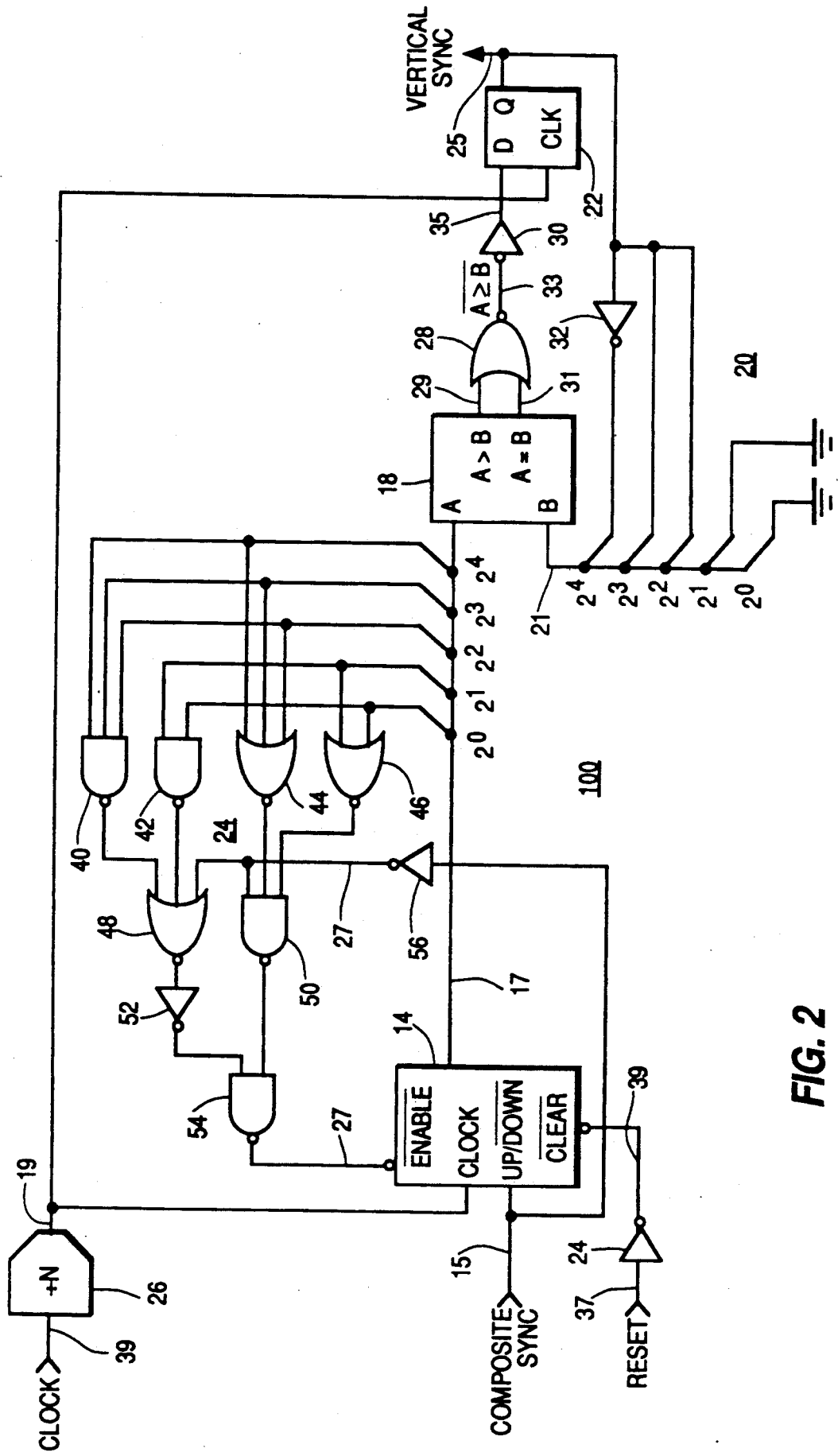

These and other aspects of the invention may be appreciated from the following description of the invention, in conjunction with the accompanying drawings, wherein:

FIG. 1 is a block diagram of a detector for vertical synchronizing pulses in accordance with this invention; and, FIG. 2 is a schematic diagram of a digital circuit in accordance with the block diagram shown in FIG. 1.

A detector for vertical synchronizing pulses in accordance with this invention is shown in block diagram form in FIG. 1, and generally designated by reference numeral 10. A sync separator circuit 12 receives a composite video signal on line 13. The sync separator circuit 12 produces a composite synchronizing signal on line 15, which includes horizontal and vertical synchronizing pulses, as well as equalizing pulses. The composite synchronizing signal may also include considerable noise. The sync separator circuit 12 may comprise, for example, a conventional low pass filter having a cutoff frequency of approximately 1 MHz. Such sync separating circuits are well known.

The composite synchronizing signal on line 15 is an input to a bidirectional counting means 14, for example, an up/down counter. Counting means 14 receives clock pulses from clock 16 on line 19. The clock pulses provide a sampling rate for the counting means 14. The sampling rate is preferably at the nominal Nyquist rate or greater. The composite synchronizing signal on line 15 is sampled, for example level sampled, at each clock pulse. If a signal level at the input of the counter during a sample interval indicates that a pulse is present, the counter will increment by one count. This may be responsive to a horizontal synchronizing pulse, a vertical synchronizing pulse, an equalizing pulse or even positive polarity noise between pulses. If the level of the signal during a sample is such that no pulse is detected, or no positive noise is detected between pulses, or negative polarity noise occurring during a pulse is detected, the counter will decrement by one count. Accordingly, the output of the counter, which is illustrated as a five stage or five bit counter, will be a numerical value in binary format which increases and decreases responsive to the detection and nondetection of pulses and noise (by level detection, for example) in the composite synchronizing signal.

The numerical output of counting means 14 on lines 17 is applied to a comparing means 18, for example a comparator, and to a wrap around inhibitor circuit 24. In carrying out the invention, counting means 14 may be embodied as a nonwrapping counter. In other words, the counting means is configured to hold at maximum and minimum numerical values, respectively, despite further detections and nondetections of the level, respectively, in subsequent sample intervals. A five bit counter provides a range of 32 counts, the minimum numerical value being defined as 0 and the maximum numerical value being defined as 31. The operation of the wrap around inhibitor 24, which also receives the composite synchronizing signal as an input from line 15, is explained in more detail in connection with FIG. 2.

Lines 17 are coupled to a first input A of comparing means 18. A reference count generator or numerical encoding means 20 produces a numerical output on lines 21, in binary format, which is coupled to a second input B of comparing means 18. Comparing means 18 may be configured to provide an output when the numerical value at the A input is greater than the numerical value at the B input, or alternatively, when the numerical value at the A input is greater than or equal to the numerical value at the B input. An output pulse will be generated on line 23, as illustrated for example, whenever the numerical count at input A is greater than or equal to the numerical count at input B. This will correspond, for example, to detection of a vertical synchronizing pulse in the composite synchronizing signal.

It will be appreciated that the clock rate or sampling rate provided by cock 16 must have a frequency which is high enough to provide adequate resolution for the timing of the vertical output on line 25. In the NTSC system, for example, horizontal synchronizing pulses have a pulse width of approximately 4.75 microseconds and vertical synchronizing pulses have a pulse width of approximately 31.75 microseconds. Six vertical synchronizing pulses are transmitted sequentially, with five serrations therebetween, having a combined width of approximately 190.5 microseconds. The serrations and the equalizing pulses have a width of approximately 2.54 microseconds, which is somewhat narrower than the horizontal synchronizing pulses.

An appropriate clock rate or sampling rate may be 398 KHz, for example, which corresponds approximately to 25 fH, that is, twenty five times the horizontal synchronizing rate. Each clock pulse has a period of approximately 2.5 microseconds. Depending upon timing tolerances, each horizontal synchronizing pulse might result in one, two, or three consecutive incremental counts. Each equalizing pulse might result in one or two incremental counts. Each serration might result in one or two decremental counts. Each vertical synchronizing pulse might result in 11, 12, or 13 consecutive incremental counts. Six consecutive vertical synchronizing pulses might result in approximately 71 to 78 incremental pulses, the intervening serrations resulting in approximately 5 to 12 decremental counts. The numbers of counts are merely illustrative. Random noise can be expected to provide an occasional incremental count in the absence of any pulses, and an occasional decremental count during occurrence of a pulse. In no instance is variation by a small number of incremental or decremental counts expected to be of any practical consequence. Inasmuch as each horizontal synchronizing pulse is separated by approximately 63.5 microseconds, it is expected that the absence of pulses after termination of each horizontal synchronizing pulse will supply sufficient decremental counts to promptly and effectively erase, that is, count down the preceding upward counts from each horizontal synchronizing pulse. Equalizing pulses are processed in a similar fashion. Noise which is substantially random in the intervals between horizontal synchronizing pulses, as well as in the interval between equalizing pulses, Can be expected to have no net effect in incrementing the counter. On the contrary, it can be expected that the numerical output of the counter would be decremented to zero.

In order to prevent the absence of pulses from being construed as the presence of a pulse, and vice versa, by having the counter wrap around after achieving minimum and maximum values, the counter is configured to hold at minimum and maximum values by the wrap around inhibitor circuit 24. Accordingly, when the counter reaches a minimum count, for example 0, nondetections of the level during subsequent samples or sample intervals will not be effective to lower the output of the counter below 0. If the counter were permitted to wrap around, the next value below 0 is the maximum count of the counter, for example 31. Similarly, when a pulse has been detected, and a sufficient number of detections of the level during successive samples or sample intervals raises the numerical output of the counter to its maximum, for example 31, the counter will not be permitted to count higher responsive to subsequent detections in subsequent samples. If the counter were permitted to wrap around, the next highest count would be 0.

In order to provide further noise immunity, particularly at the leading and trailing edges of the vertical synchronizing pulses, the detector may be configured to exhibit a hysteresis characteristic in switching. This can be accomplished by having the output of the comparing means 18 generate an output signal when the numerical output of the counting means exceeds a first reference value, and terminate the output signal when the numerical output of the counting means falls below a second reference value, the first reference value being greater than the second reference value. Use of a nonwrapping counter permits use of a counter having a relatively small number of stages as compared to the long time interval of six vertical synchronizing pulses and the relatively long interval between each horizontal synchronizing pulse.

In order to provide immunity from noise generated by switching in the counting means and in the comparing means, the output of the comparing means on line 23 is sampled by latch means 22, for example at the clock or sampling rate provided by clock 16. The output of latch means 22, on line 25, is a regenerated vertical synchronizing signal having clean edges for timing purposes.

The reference count generator or numerical encoding means 20 may be a numerical encoding circuit for supplying the first and second reference counts to the comparing means. In order to minimize the circuitry, the vertical synchronizing signal itself may be utilized as a control signal for determining when each of the reference counts is supplied by the reference count generator 20 to the B input of the comparing means 18.

A digital circuit in accordance with the block diagram of FIG. 1 is shown in FIG. 2. Like reference numerals have been applied in FIGS. 1 and 2 wherever appropriate. The digital circuit is generally designated by reference numeral 100. If the circuit is part of a television receiver, for example, a source of clock rate pulses is available, as shown on line 39; a composite synchronizing signal is available, as shown on line 15; and, a reset signal is available, as shown on line 37. In the event the clock rate available is faster than necessary for proper sampling of the composite synchronizing signal, a divide by N circuit 26 may be provided. The clock rate, divided down if necessary to an appropriate sampling frequency, is available on line 19 as an input to an up/down counter 14 and a latch 22, which may be a D type flip/flop.

The up/down counter 14 is provided with a CLOCK input, an up/$\overline{\text{DOWN}}$ count direction control input, an $\overline{\text{ENABLE}}$ input and a $\overline{\text{CLEAR}}$ input. Counter 14 is illustrated as a five bit counter, and accordingly its output is a set of five lines 17, representing numerical count data bits $2^0$, $2^1$, $2^2$, $2^3$ and $2^4$. The range of up/$\overline{\text{DOWN}}$ counter 14 is therefore 32 counts, for example from 0 to 31. The CLOCK input of such a counter is normally positive edge triggered. Alternatively, the CLOCK input may be negative edge triggered or level triggered. The up/$\overline{\text{DOWN}}$ count direction control input is coupled to the composite synchronizing signal on line 15. The counter will increment or decrement, that is count up or count down, at the leading edge of each clock pulse. The counter will count up or count down depending upon the level of the signal at the up/$\overline{\text{DOWN}}$ control input. If a pulse or noise of sufficient magnitude is present at the time of sampling, the counter will count up by one count. Conversely, if there is no pulse present, or if noise present is of insufficient magnitude, or if negative noise of sufficient magnitude is present during a pulse at the time of sampling, the clock will count down by one count. Counter 14 may be cleared, for example, having its numerical output set to 0 during a power up condition, by a reset signal on line 37. The reset signal may need to be inverted, as shown by inverter 24, and thereafter supplied to the $\overline{\text{CLEAR}}$ input of the counter on line 39.

Up/down counter 14 is preferably a nonwrapping counter, that is, a counter which when counting upwardly will not exceed its maximum count, for example 31; and when counting downwardly, will not fall below its minimum count, for example 0. If up/down counter 14 was configured to wrap around, then an upward count from maximum, for example 31, would result in a numerical output of 0. Similarly, a count downward from minimum, for example 0, would result in a numerical output of 31.

Up/down counter 14 is prevented from wrapping around by wraparound inhibitor circuit 24. Logical NAND gates 40 and 42 detect the presence of the maximum count, wherein each of the data bits is equal to 1. Logical NOR gates 44 and 46 detect the presence of a minimum count, wherein all data bits are equal to 0. The outputs of NAND gates 40 and 42 are inputs to logical NOR gate 48. The outputs of NOR gates 44 and 46 are inputs to logical NAND gate 50. The composite synchronizing signal is inverted by inverter 56, and applied as an additional input to each of NOR gate 48 and NAND 50. The output of NOR gate 48 is inverted by inverter 52. The output of inverter 52 and the output of NAND gate 50 are inputs to logical NAND gate 54, the output of which is coupled by line 27 to the $\overline{\text{ENABLE}}$ input of counter 14. When the $\overline{\text{ENABLE}}$ input of counter 14 is a logical LO, the counter will count up or down at the clock rate. When line 27 is a logical HI, counter 14 is disabled, that is, inhibited from counting. Briefly, if the counter is at a maximum count, and if the state of the composite synchronizing signal at the next sample would otherwise result in an upward count, counter 14 is disabled. A downward count would be permitted. Conversely, if a minimum count has been detected, and if the composite synchronizing signal is such that the next sample would result in a downward count, the counter will be disabled. An upward count would be permitted. The use of a nonwrapping counter makes it possible to sample wide pulses, such as vertical synchronizing pulses, without requiring a counter having a large number of stages. Fewer stages also tend to generate less switching noise.

The numerical output of up/down counter 14 is also coupled to a first input A of comparator 18. The second input B of comparator 18 is coupled by numerical reference count data lines 21 to the output of numerical encoding circuit 20. Numerical encoding circuit 20 provides one or more numerical reference counts or values against which the numerical output of the up/down counter 14 may be compared. The numerical output of numerical encoding circuit 20 will be one of two numbers, one larger than the other, depending upon the logical state of the Q output of latch 22. As illustrated, the larger value, for example 16, is supplied to comparator 18 after a detected vertical synchronizing pulse has been terminated. The lower reference value, for example 12, is supplied to comparator 18 after the beginning of a vertical synchronizing pulse has been detected.

Comparator 18 has two outputs, one of which generates a signal when the numerical value at input A is greater than reference value at input B and the other of which generates an output when the numerical value at input A is equal to the numerical reference value at input B. These signals are provided on lines 29 and 31, respectively, as inputs to logical NOR gate 28. Comparator 18 provides an output, $A \geq B$, whenever A is greater than or equal to B. This signal is present whenever the output of NOR gate 28 is a logical LO as $\overline{A \geq B}$. This signal is inverted by inverter 30 and applied on line 35 as an active HI input to latch 22.

In operation, up/down counter 14 samples the level of the composite synchronizing signal at the clock rate provided in line 19. Whenever the numerical output of counter 17 is equal to the numerical reference value at input B of comparator 18, and for as long thereafter as the numerical output of counter 14 remains greater than or equal to the numerical value at input B, a vertical sync detection pulse, $\overline{A \geq B}$, will be generated at the output of NOR gate 28. As the counter is counting down, the vertical sync detection pulse will terminate whenever the numerical value at input A falls below the reference value at input B of comparator 18.

The active HI vertical sync detection pulse is applied to the D input of D type flip/flop 22, which samples the vertical sync detection output at the clock rate. The Q output of D type flip/flop 22 goes HI to supply each regenerated vertical synchronizing pulse to form a vertical synchronizing signal. When the Q output of latch 22 is a logical HI, the numerical reference value will be 12. Conversely, whenever the Q output of latch 22 is a logical LO, the reference value will be 16. Inverter 32 enables the numerical reference value to alternate, or toggle, responsive to the Q output of latch 22. The use of a lower reference value for terminating the vertical sync detection pulse effects hysteresis in switching, to inhibit multiple triggering edges in the regenerated vertical synchronizing pulse, for example, due to noise or to other problems at the trailing edge of the vertical synchronizing pulses in the composite synchronizing signal. The amount of hysteresis will depend upon the difference between the reference values.

In certain circumstances, it is more important to detect vertical synchronizing pulses with minimum delay, sacrificing some noise immunity. In other circumstances, noise immunity is of more importance than avoiding delays in detection. More particularly, for example, when storing video information for use in a pix in pix display, the more rapid detection of the vertical synchronizing pulses is generally of more importance than maximum noise immunity. On the other hand, when reading video information out of storage for a pix in pix display of an inset or secondary picture, accurate timing and maximum noise immunity are generally of more importance than minimizing delays in detection of the vertical synchronizing pulses. In a similar circuit having more pronounced hysteresis, for example, it may be desirable to use a clock pulse sampling rate of 1.93 MHz, utilizing an upper reference value of 28 for initiating the vertical sync detection pulse and utilizing a lower reference count of 3 for terminating the vertical sync detection pulse.

It will be appreciated that the vertical synchronizing detector illustrated in FIGS. 1 and 2, which exhibits substantial noise immunity and provides hysteresis switching characteristics, is also useful generally as a low pass filter for pulses in a signal wider than other pulses in the signal. The cut off frequency will be a function of sampling rate, pulse width and noise level and is ultimately limited by the switching rates of the digital circuits.

What is claimed is:

1. A detector for video signal synchronizing pulses, comprising:
    counting means for periodically level sampling an input including synchronizing pulses, the counting means having a numerical output which changes in a first sense responsive to detection of said level during a sample interval and changes in an opposing sense responsive to nondetection of said level during a sample interval; and,
    comparing means for generating a sync detection pulse as an output signal by relation of the numerical output of the counting means to different reference values.

2. The detector of claim 1, wherein the comparing means initiates the sync detection pulse by relation of the numerical output of the counting means to one of the reference values and terminates the sync detection pulse by relation of the numerical output of the counting means to the other of the reference values.

3. A detector for video signal synchronizing pulses, comprising:
    counting means for periodically level sampling an input including synchronizing pulses, the counting means having a numerical output which changes in a first sense responsive to detection of the level during a sample interval and changes in an opposing sense responsive to nondetection of the level during a sample interval;
    comparing means for generating a sync detection pulse as an output signal when the numerical output of the counting means goes beyond a reference value, the reference value being alternately one of first and second numerical reference counts, the first reference count being different than the second reference count; and,
    the comparing means initiating the sync detection pulse by relation of the numerical output of the counting means to the first reference count and terminating the sync detection pulse by relation of the numerical output of the counting means to the second reference count.

4. The detector of claim 3, wherein the comparing means initiates the sync detection pulse when the numerical output of the counting means rises to equal the first reference count.

5. The detector of claim 3, wherein the comparing means terminates the sync detection pulse when the numerical output of the counting means falls below the second reference count.

6. The detector of claim 3, wherein the numerical reference supplied to the comparing means is changed at times related to initiation and termination of each sync detection pulse.

7. The detector of claim 1, further comprising pulse shaping means for sampling the output signal of the comparing means and generating a vertical synchronizing signal.

8. The detector of claim 1, wherein the counting means is configured to hold at maximum and minimum numerical values respectively, despite further and respective detections and nondetections of said level during subsequent sample intervals.

9. The detector of claim 1, wherein the counting means comprises a digital nonwrapping up/down counter for incrementing and decrementing the numerical output at the sampling rate responsive lo an up/down count direction control input coupled to the composite synchronizing signal.

10. The detector of claim 1, further comprising means for generating the input by separating the composite synchronizing signal from a composite video signal.

11. The detector of claim 10, wherein the separating means comprises a low pass filter having a cutoff frequency of approximately 1 MHz.

12. The detector of claim 1, further comprising means for generating a sampling rate signal for the counting means.

13. The detector of claim 7, further comprising means for generating a sampling rate signal for the pulse shaping means.

14. A digital filter for detecting television scanning synchronizing pulses, comprising:
   means for supplying at least one sampling rate clock signal;
   an up/down counter for level sampling a signal to be filtered at the clock rate, the counter having a numerical output which changes in a first sense responsive to detection of said level during a sample interval and changes in an opposing sense responsive to nondetection of said level during a sample interval; and,
   a comparator for generating a synchronizing pulse detection signal as an output by relation of the numerical output of the counter to different numerical references.

15. The detector of claim 14, wherein the comparator initiates the synchronizing pulse detection signal by relation of the numerical output of the counter to one of the numerical references and terminates the synchronizing pulse detection signal by relation of the numerical output of the counter to the other of the numerical references.

16. A digital filter for detecting television scanning synchronizing pulses, comprising:
   means for supplying at least one sampling rate clock signal;
   an up/down counter for level sampling a signal to be filtered at the clock rate, the counter having a numerical output which changes in a first sense responsive to detection of said level during a sample interval and changes in an opposing sense responsive to nondetection of said level during a sample interval;
   a comparator for generating a synchronizing pulse detection signal as an output when the numerical output of the counter goes beyond a numerical reference, the numerical reference being alternately one of first and second numerical reference counts, the first reference count being greater than the second reference count; and,
   the comparator initiating the synchronizing pulse detection signal when the numerical output of the counter rises above the first reference count and terminating the synchronizing pulse detection signal when the numerical output of the counter falls to the second reference count.

17. The detector of claim 16, wherein the comparator initiates the synchronizing pulse detection signal when the numerical output of the counter rises to equal the first reference count.

18. The detector of claim 16, wherein the comparator terminates the synchronizing pulse detection signal when the numerical output of the counter falls below the second reference count.

19. The detector of claim 14, further comprising a latch for sampling the synchronizing pulse detection signal and generating an output pulse for each synchronizing pulse detected.

20. The detector of claim 19, wherein the latch is a D type flip/flop.

21. The detector of claim 14, wherein the counter is a nonwrapping counter.

22. The detector of claim 16, further comprising a numerical encoding circuit for supplying the first and second reference counts to the comparator responsive to the output signal of the comparator.

23. The detector of claim 16, further comprising a latch for sampling the synchronizing frequency pulse detection signal and generating an output pulse for each synchronizing pulse detected.

24. The detector of claim 23, further comprising a numerical encoding circuit for supplying the first and second reference counts to the comparator responsive to the output pulses of the latch.

* * * * *

UNITED STATES PATENT AND TRADEMARK OFFICE
CERTIFICATE OF CORRECTION

PATENT NO. : 5,031,041

DATED : July 9, 1991

INVENTOR(S) : Russell T. Fling

It is certified that error appears in the above-identified patent and that said Letters Patent is hereby corrected as shown below:

On the Title page, please add the following notice:

--The term of this patent subsequent to August 9, 2007
  has been disclaimed.--

Signed and Sealed this

Thirteenth Day of October, 1992

Attest:

DOUGLAS B. COMER

*Attesting Officer*   *Acting Commissioner of Patents and Trademarks*